Patented Nov. 9, 1926.

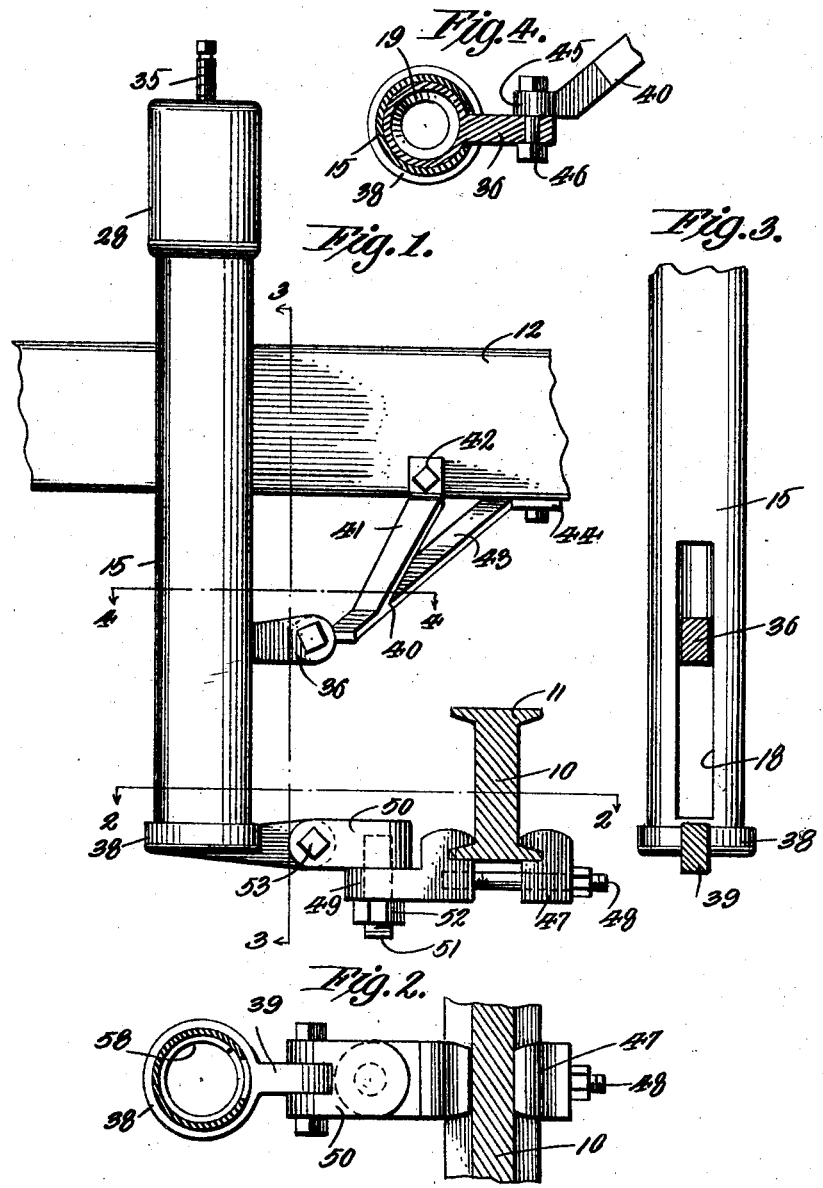

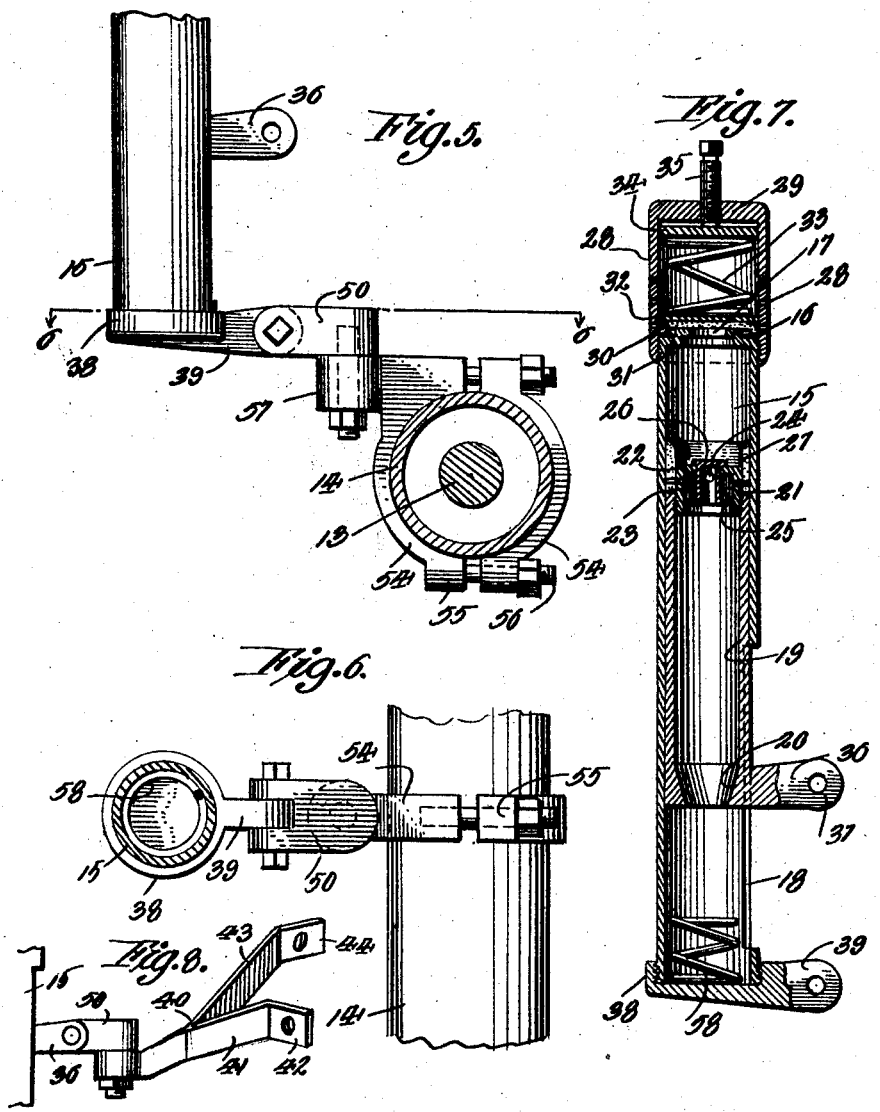

1,606,467

UNITED STATES PATENT OFFICE.

EDWARD B. DAVIS, OF CAMBRIDGE, OHIO.

SHOCK ABSORBER.

Application filed November 6, 1925. Serial No. 67,449.

This invention relates to improvements in vehicle attachments, and has particular reference to shock absorbers adapted to check the rebound of the vehicle spring.

An important object of the invention is to provide an attachment of the above character adapted to be securely connected with a vehicle axle and frame and designed to check the relative movement of these structures.

A further object of the invention is the provision of a shock absorbing attachment constructed so as to be conveniently mounted on the forward and rear portions of a vehicle so as to materially improve the riding qualities thereof.

Still another object of the invention is the provision of a shock absorbing apparatus of a durable yet comparatively simple construction designed to be efficient in operation and manufactured at a comparatively low cost.

Other objects and advantages of the invention will be apparent as the description progresses.

In the accompanying drawings forming a part of this specification and in which like reference characters are employed to designate corresponding parts throughout the same:

Figure 1 is a side elevation of a shock absorbing attachment constructed in accordance with my invention shown in operative position, Figure 2 is a horizontal sectional view taken on the line 2—2 of Figure 1, Figure 3 is a vertical sectional view taken on the line 3—3 of Figure 1, Figure 4 is a horizontal transverse sectional view taken on the line 4—4 of Figure 1, Figure 5 is a fragmentary side elevational view of the shock absorber illustrating in detail the connecting member employed on the rear of the vehicle, Figure 6 is a horizontal transverse sectional view taken on the line 6—6 of Figure 5.

Figure 7 is a central vertical sectional view taken through the assembled structure embodying my invention, and Figure 8 is a detail view illustrating a modified application of one of the connecting members.

In the drawings, wherein for the purpose of illustration is shown the preferred embodiment of my invention, the numeral 10 designates the front axle commonly employed upon conventional types of automobiles, the extremities of this axle connecting with suitable wheel spindles and the intermediate portion arranged to support the forward vehicle spring, as is well known to those familiar with this art. As is readily apparent, from Figure 1 of the drawings, this axle is of the I beam type provided at its upper and lower edges with transversely extending flanges 11. Mounted in an elevated position above the axle is the vehicle frame, a fragmentary portion thereof being shown in Figure 1 and indicated by the numeral 12. This frame usually embodies a pair of longitudinal channel beams, a portion of which is illustrated to indicate the connection of my improved structure in association therewith. With reference to Figure 5, it will be noted that a conventional type of automobile rear end construction is shown, embodying the usual drive axle 13 and rear axle housing 14, mounted in spaced relation about the axle. This structure is old, and well known in the art, and is merely shown in the accompanying drawings to illustrate the attachment of my improved apparatus thereon.

Referring now more particularly to the structure embodying my invention, the numeral 15 designates a cylinder of longitudinal construction, the lower end being open and externally screw threaded. The upper extremity of the cylinder 15 is provided with a raised off-set flange 16 provided at its center with a reduced opening 17, thus providing an elevated seat for a suitable closure member to be described more fully hereinafter. The lower portion of the cylinder 15 is provided with a longitudinal slot 18 extending from a point a short distance above the lower open end of the cylinder to a point at substantially the center thereof.

Mounted in the cylinder 15 so as to be readily reciprocated therein is a tubular piston 19, open at the upper and lower extremities, and the lower end provided with a tapered bore 20. The upper extremity of the piston 19 is internally screw threaded for connection of a cylindrical valve casing 21. This valve casing 21 is entirely open at its lower end while the upper extremity is provided with a tapered flange 23 formed about an opening of reduced diameter.

This valve casing 21 is designed to movably support a valve structure indicated in its entirety at 23 in the form of a tubular sleeve, the lower end being open while the upper end is enclosed by a top plate 24 of enlarged diameter so as to extend substantially over the cylindrical body or sleeve portion. The lower end of this valve is externally screw threaded for engagement with an internally threaded flange 25 of comparatively narrow structure designed to provide an extension ring at the lower end of the valve structure. With particular reference to Figure 7, it is apparent that the cylindrical body 23 of the valve is arranged to be vertically slidable in the reduced opening formed in the top of the valve casing 21. The enlarged formation of the valve head 24 will restrict the downward movement of the valve, while the screw threaded ring mounted on the lower end of the valve body will limit the upward movement thereof. In order that the valve 23 may be properly operated the cylindrical body is provided with a plurality of transverse openings 26 formed adjacent the valve head 24, the purpose of which will become apparent as the description progresses.

In order to insure efficient operation of the piston in the cylinder 15 and prevent the leakage of air therebetween, the upper portion of the piston carries an annular packing ring 27, extending about the upper portion of the valve casing 21 and projecting substantially thereabove. This packing ring which is preferably formed of leather or similar material is inserted tightly between the valve casing and the cylinder walls and securely attached thereto by rivets or the like. This construction will provide a tightly packed piston adapted to conform to the inner cylinder walls and prevent leakage about the piston.

The upper portion of the cylinder 15 carries mechanism adapted to automatically control the outlet of air compressed in the cylinder by movement of the piston, this mechanism embodying an auxiliary cylinder tube 28 of cylindrical formation enclosed at its upper end with a top plate 29 of substantial thickness and open at its lower end. This lower open end of the tube 28 is internally screw threaded for threaded engagement with the upper portion of the cylinder 15, as is readily evident from Figure 7 of the drawings. This tubular member forms a housing for a yieldable valve structure adapted to form a closure for the upper end of the cylinder 15 and release the air pressure in the cylinder above a predetermined pressure. With this in mind, a packing disc 30 is arranged to be snugly seated upon the raised flange 16 of the cylinder and is provided with an annular flange 31. This packing disc, preferably constructed of leather or similar material, is retained firmly in position on the raised flange 16 by the provision of a circular metallic plate 32 formed so as to be readily movable in the tube 28 and adapted to form a base for a coiled compression spring 33. This spring is compressed between the lower base disc 32 and an upper circular disc 34 of durable metallic construction vertically movable in the tube and designed to permit adjustment of the spring. The relative position of the upper disc 34 is regulated by means of a set screw 35 threadedly mounted through a screw threaded opening formed in the center of the tube top plate 29 and constructed so as to extend within the auxiliary tube 28 when desirable. From this construction it is obvious, that the compression of the spring 33 may be readily regulated by adjustment of the set screw 35, rotary movement of this screw forcing the upper disc 34 downwardly so as to compress the coiled spring 33 or, when desirable, permitting the disc 34 to assume an elevated position so as to release the compression of the spring.

Referring now to Figure 7 of the drawings, it will be seen that the movable piston 19 is provided with a laterally extending arm 36 apertured adjacent its extremity as at 37 and arranged to provide a suitable connecting member. This arm is preferably formed integral with the piston construction adjacent the lower extremity thereof and is constructed so as to project through the longitudinal slot formed in the cylinder walls and conveniently slidable therein.

The lower extremity of the cylinder also carries a suitable connecting member, the structure in this instance embodying a detachable member formed to provide a flanged cap internally screw threaded as indicated by the numeral 38 and adapted to threadedly engage the lower end of the cylinder 15. Formed integral with this cap 38 and extending laterally therefrom in a parallel position with the arm 36 formed on the piston, is a complementary connecting arm 39 apertured as in the first instance, for convenient connection thereof.

The arm 36 formed on the piston 19 is to be connected with a suitable bracket mounted on the vehicle frame. In order that the bracket used for this purpose may be conveniently assembled on the vehicle frame and at the same time provide a suitable connection with the piston arm, a special type of bracket is provided embodying a substantially V-shaped body 40 composed of a pair of diverging angularly directed legs of unequal length. The shorter leg 41 is provided at its extremity with an angular apertured flange 42 adapted for connection with the outer side of the frame channel beam 12. The longer leg 43 is provided with an obtused angled connecting flange 44 apertured to permit fastening with the lower flange of the frame beams. The opposite extremity of the bracket 40 is provided with an ear 45 shown to advantage in Figure 4, adapted to align with the aperture in the arm 36 of the piston and connected by a bolt 46. This type of bracket provides a durable and easily connected supporting structure designed to obtain the best results in the operation of my improved shock absorber.

The lower arm 39 secured to the lower extremity of the cylinder 15 is supported by a suitable bracket structure adapted to firmly engage the front axle of the vehicle, of course, upon the front shock absorbers. This structure embodies a pair of complementary clamp lugs 47 provided on their inner faces with recesses engageable with the flanges 11 of the axle and provided with longitudinally aligned screw threaded bores engageable with a threaded screw 48 for adjustable movement of the clamp. One of the clamp lugs 47 is provided with a laterally projecting apertured flange 49 adapted to support a U-shaped auxiliary bracket 50. The lower face of this bracket carries a downwardly projecting screw threaded pin 51 adapted to project through the opening formed in the flange 49 and secured in position by a nut 52. The parallel projections of the bracket 50 are apertured and are placed in alignment with the aperture formed in the arm 39, and these members are connected by a bolt 53. The foregoing bracket structure is designed to facilitate connection of my improved attachment on the front axle of a vehicle and provides a bracket of durable formation constructed so as to firmly engage the axle structure and thus retain the shock absorber securely fastened in position. The provision of the detachable element facilitates the disconnection of the attachment or replacement of faulty mechanism.

It is of course preferable to mount the absorbers on both the forward and rear ends of the vehicle, and while I have described a special type of bracket intended for connection with the front axle of the vehicle, it will be advisable to provide a suitable connecting bracket for the rear vehicle structure. This is accomplished, in the present instance, by the provision of a bracket structure embodying a pair of complementary semi-circular clamp sections 54 the inner sides thereof being formed so as to conform to the curvature of the rear axle housing 14 and the sections disposed in separated co-acting positions. The ends of the sections 54 are formed with tubular sleeves 55, for connection with connecting bolts 56. One of the sections is provided with a laterally extending ear 57 having a vertical bore formed therethrough for suitable connection with a U-shaped auxiliary bracket 50. By securely fastening the bolts 56 in position on the complementary section 54 the clamping structure will be firmly attached to the rear axle housing and the apparatus readily mounted in position for use.

Referring with particularity to the structure shown in Figure 7 of the drawings, attention is invited to the provision of a loosely mounted coiled spring 58 positioned at the bottom of the cylinder 15. This spring extends substantially in an elevated position in the cylinder and is provided to cushion the extreme downward movement of the piston in the cylinder and thus avoid the danger of sudden contact of the structures and the possibility of injuring the same.

In operation, when a vehicle is traveling over an uneven roadway, the sudden movement imparted to the vehicle axles is cushioned or partially absorbed by the vehicle springs, interposed between the axles and the vehicle frame. This action is followed by sudden upward movement of the vehicle frame and body, as the shock is transferred to the vehicle springs, caused by the normal tendency of the springs to assume a predetermined formation. Consequently the vehicle body will continue to vibrate for a considerable period and thus cause inconvenience to the occupants thereof.

My improved structure is intended to provide an apparatus which will materially reduce the rebound effect of the frame and cause the relative movement of the frame and axles to be gradually returned to normal positions. This is accomplished by the connection of the cylinder 15 with the forward or rear axles of the vehicle. It is evident from this connection, that the cylinder and mechanism embodied therein will be vertically jolted directly with the movement of the wheels. The piston 19 movable relative to the cylinder 15 is connected with the vehicle frame in the manner previously described. When the vehicle is proceeding over a road-way and the wheels are suddenly jolted upwardly by a raised formation on the road, the shock imparted to the vehicle axle will be cushioned by the movable springs. The initial movement of the axle relative to the frame will cause the piston 19 to assume a position adjacent the lower end of the cylinder. On the rebound action of the vehicle springs tending to suddenly elevate the vehicle body, the piston 19 will be moved upward into the cylinder 15. As the piston 19 is forced upwardly in the cylinder the valve 23 will be firmly seated on the casing flange 22, the valve assuming a downwardly extended position. The head of the valve will then be firmly closed, and the air in the upper portion of the cylinder compressed to a comparatively high pressure. When the pressure in the upper end of the cylinder has reached a predetermined degree the discs 30 and 32 will be elevated so as to release the compressed air through the opening 17 formed in the top of the cylinder. This air then escapes through a plurality of openings 28' formed in the side walls of the tube 28. It will be noted, from the foregoing description and the drawings, that the pressure at which the compressed air in the cylinder will be released, may be regulated by adjustment of the set screw 35, until satisfactory action is obtained. On the return downward stroke of the piston 19 the air is forced upwardly through the bore of the piston and will elevate the movable valve 23 so that the air may freely pass through the valve structure into the upper head end of the cylinder for subsequent action of the piston.

It is thus apparent that a shock absorber of comparatively simple yet durable construction has been provided, designed to permit gradual return movement of the vehicle springs and thus avoid continuous swaying movement of the vehicle. Additional advantages will be noted by referring to my patented structures along this line as disclosed in patents numbered 1,513,970 and 1,513,971, filed October 18, 1923, and March 14, 1924, respectively.

It is to be understood that the form of my invention herewith shown and described is susceptible of modification and that minor changes may be resorted to without departing from the spirit of the invention or the scope of the subjoined claims.

When a more durable front connection is desirable the bracket 40 may be mounted in a position at right angles to that shown in Figure 1 and connected with the piston arm 36 by the use of an auxiliary bracket 50, as shown to advantage in Figure 8.

Having thus described my invention, I claim:

1. A shock absorber comprising a cylinder having a longitudinal slot therein, a piston mounted in the cylinder for reciprocating movement, a projecting arm formed on the piston adapted to project through the slot formed in the cylinder, a valve mounted on the piston and adapted to automatically open and close the piston to control the passage of air therethrough, a projecting arm secured to the cylinder, and automatically operated mechanism associated with the upper end of the cylinder adapted to permit the escape of air above a predetermined pressure, means for controlling the operation of the said mechanism, and means for connecting the projecting arms carried by the cylinder and piston to relatively movable structures of a vehicle.

2. A shock absorber including a cylinder having a slot formed in the side wall thereof, a piston mounted in the cylinder for reciprocating movement, a projecting member formed on the piston adapted to extend through the slot formed in the cylinder, a valve movably mounted on the piston adapted to automatically close during the working stroke of the piston and open for the passage of air during the return stroke, means for cushioning the extreme return movement of the piston in the cylinder, mechanism mounted on the cylinder adapted to automatically operate to release air above a predetermined pressure, means for regulating the operative pressure of the said releasing mechanism, and means for securing the piston and the cylinder respectively to relatively movable structures of a vehicle.

3. A shock absorber including a cylinder having a longitudinal slot formed adjacent the lower portion, a piston mounted in the cylinder for reciprocating movement, a projection formed adjacent the lower end of the piston adapted to extend through the slot in the cylinder, a valve casing mounted on the cylinder, a valve movably mounted on the valve casing, the said valve being arranged to automatically open the piston during return movement to permit the passage of air therethrough, means mounted in the lower end of the cylinder adapted to cushion the extreme return movement of the piston, air control mechanism mounted on the cylinder including a tube enclosed at the upper end and connected with the cylinder at the lower end having apertures in the side walls thereof, discs normally seated on the upper end of the piston adapted to enclose the upper end, means for normally retaining the discs firmly in position upon the cylinder and operable to release the air above a predetermined pressure, means for adjusting the pressure of the said closure means, and connecting brackets engageable with the cylinder and piston and adapted to secure these members to the axle structure and vehicle frame respectively.

4. A shock absorber including a cylinder having a longitudinal slot formed adjacent the lower portion thereof, a piston mounted in the cylinder for reciprocating movement, a laterally projecting arm formed on the piston and adapted to project through the slot formed in the cylinder, a valve casing threadedly mounted at the upper end of the piston, a packing ring mounted adjacent the upper end of the piston, a valve movably mounted on the said valve casing including a cylindrical body vertically movable through the casing, an enlarged head plate formed on the upper end of the valve body, an annular flange mounted on the lower end of the valve body, the said body being apertured adjacent its upper end to permit elevation of the valve during the return movement of the piston and the passage of air therethrough, a tubular housing mounted on the upper open end of the cylinder, closure discs adapted to normally enclose the cylinder opening, spring means adapted to force the disc tightly upon the cylinder and arranged to permit the escape of air above a predetermined pressure, a set screw mounted on the top of the tubular housing to adjust the pressure of the spring means, a projecting arm secured to the lower end of the cylinder, a bracket having means for attachment with a vehicle frame detachably secured to the arm formed on the piston, a bracket adapted for detachable connection with a vehicle axle engageable with the arm formed on the cylinder, and means for readily securing the said bracket with the cylinder arm.

5. A shock absorber comprising a cylinder having a longitudinal slot adjacent the lower end thereof and an opening at the upper end, a piston mounted in the cylinder for reciprocating movement, an arm formed on the piston and projecting through the slot in the cylinder, an automatically operated valve mounted on the piston adapted to permit the passage of air therethrough during predetermined movement of the piston, a closure cap securely mounted on the lower end of the cylinder, a laterally extending arm formed integral with the closure cap, a coiled spring positioned in the lower end of the cylinder and adapted to cushion the extreme return movement of the piston, a cylindrical tube mounted on the upper end of the cylinder enclosed at its upper end and having openings formed in the side walls, a packing disc positioned on the upper open end of the cylinder, a rigid reinforcing disc mounted on the packing disc, a coiled spring positioned on the said discs adapted to firmly press the said discs upon the cylinder, a set screw adapted to permit adjustment of the coiled spring, a V-shaped bracket adapted to be secured to the frame of a vehicle and detachably secured to the arm formed on the piston, an axle engaging bracket formed of a pair of complementary sections, means for adjusting the position of the said sections, and means for connecting the said axle brackets with the arm secured to the cylinder.

6. In a shock absorber including a cylinder having a slot formed therein, a piston reciprocable in the cylinder having a projection formed thereon and extending through the slot in the cylinder, an automatically acting valve carried by the piston to compress the air on the working stroke and release the air on the return stroke, air exhaust means mounted on the cylinder, and an attaching bracket secured to the cylinder; a resilient cushioning member mounted in the cylinder so as to cushion the contact of the piston at the end of its return movement.

In testimony whereof I affix my signature.

EDWARD B. DAVIS.